Jan. 11, 1966  Y. PALTI  3,229,075
READING DEVICE
Filed March 14, 1962
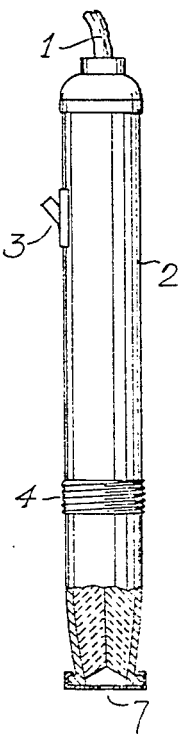
Fig.1
Fig.2
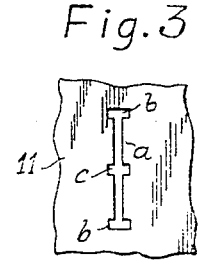
Fig.3
Fig.4
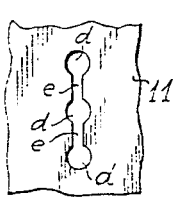
Fig.5
Fig.6
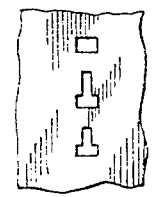
INVENTOR.
YORAM PALTI
BY
Kirschberg, Kirschberg & Meyer
ATTORNEYS

United States Patent Office 3,229,075
Patented Jan. 11, 1966

3,229,075
READING DEVICE
Yoram Palti, Jerusalem, Israel, assignor to Yissum Research Development Company, Jerusalem, Israel, a limited-liability company of Israel
Filed Mar. 14, 1962, Ser. No. 179,661
Claims priority, application Israel, Dec. 13, 1961, 16,471
4 Claims. (Cl. 235—61.11)

The present invention relates to a reading device for use as a reading aid for the blind, or as a means by which printed information can be translated into impulses, thus being coded, to be fed into various apparatus or computers.

There are known apparatus by means of which ordinary printed matter is translated into electrical signals, each signal or series of signals being distinctive of a certain letter. Apparatus of this kind may emit a succession of sounds, quasi a kind of a melody, which—after a sufficient period of training—can be understood by the blind in the same way as a seeing person reads a text and understands it.

Modern apparatus of this kind usually comprise a pencil-like casing which contains a light source and means for projecting a narrow beam of light onto a page of a book or the like. The light effect obtained on the page is in the form of a narrow "vertical" strip or a dot which is moved horizontally or sometimes also vertically across the lines of print. Usually the light is projected from the source to a slot-like aperture at the end of the casing. The light is reflected back into the apparatus and into one or more photo cells. These latter are excited to a smaller or greater extent depending on the amount of dark print on the white paper, encountered by the light projected thereon. It can be understood that the effect of the light on the photo cells can be used to actuate various electronic instruments or an acoustic device, the sound of which again depends on the degree of light reflected from the page "read."

It is clear that a substantial amount of error is unavoidable with such devices in view of the fact that differently shaped letters, figures or symbols might have the same "light-value," i.e. might have the same area covered with printing ink. Such erroneous signals or identical manifestation of sound have to be overcome by the listening blind person in the same way as a sighted person can understand a word even if misprinted.

It is the object of the present invention to improve the performance of known apparatus of the kind referred to, and to reduce cases of erroneous signals to a minimum.

With this object in view the invention provides means by which the strip of light projected onto the printed matter is given a peculiar form in contradistinction to an ordinary strip- or line-like effect, or a simple flying spot of light.

The invention is described in the following description by way of example with reference to the annexed drawing. In the drawing FIG. 1 shows a reading device of the kind to which the invention may be applied.

FIG. 2 illustrates the use of the new device on a line of news print.

FIGS. 3 to 6 are examples of screens producing the different shapes of light effects to be used according to the invention.

The apparatus according to FIG. 1 is generally of known construction. The apparatus is connected to a source of electricity by means of a cable 1, which leads into the casing 2. A switch 3 is provided by means of which the apparatus can be switched on. When not in use the apparatus is usually closed by a cap (not seen) screwed on a screw thread 4 provided on the pencil-like casing 2. In the casing is provided a miniature electric bulb from which a line or strip of light 6 (FIG. 2) can be projected onto a page of printed matter. The apparatus is held in such a manner that line or strip 6 extends normal to the direction of the line of print. This is made possible by holding the apparatus so that the aperture in its forward end is in position above the page, the light from the bulb being directed to the aperture 7 through a bar of a material having the same optical properties as quartz, say methylmethacrylate resin. The light effect 6 obtained on the page is reflected through another bar of quartz-like material to a photo cell or several cells. The photo electric effects obtained at the cell are conveyed over an appropriate connection to an electronic instrument or to a small acoustic device (not seen) which emits sounds representative of the amount of light reflected from the print. These sounds can be simply produced by using a photo-conductive cell and inserting it as a changing resistance in an oscillator bridge, e.g. of the Wien type. The changing amount of light falling on the photo cell will change the resistance of the photo cell and the frequency of the oscillator will change accordingly.

Extended experiments with such apparatus have led to the most surprising result that where the light reflected onto the print was caused to pass a screen with an elongated slot of varying transversal widths or a row of apertures of varying transversal extension, the analysis of the print became much more exact and accurate. In other words mistakes and errors as referred to above were eliminated to a great extent. Where the device with the new screen had been used in association with a computer, the chance of erroneous interpretation of a signal could also be reduced by using a screen having several slots of different widths, the combined signal attained by the said slots being fed into the analysing instrument.

The invention resides, therefore, in the provision of a screen for the light aperture of reading devices of the kind referred to, such screens having at least one opening or slot narrow in width in the direction of extension of the line of print and elongated in length normal to the direction of extension of the line of print, the widths of the opening or slot being different at one point than at another point along the length thereof.

According to FIG. 3 the slot in such a screen 11 is in the shape of a band $a$, both ends of which are delimited by short cross-bars $b$, a third cross-bar $c$ extending in the middle of the band. Of course there might be four or even five such cross-bars. The slot shown in FIG. 4 is composed of three circular holes $d$ arranged in a row and connected by two short slots $e$. In FIG. 5 the aperture is composed of three triangles $f$ joined together by slots $g$. FIG. 6 shows an arrangement wherein a row of apertures is provided in the screen, the apertures being of different width.

In all four cases which are given as examples and in a non-limitative way, the light effects obtained by projecting the beam from the source of light through such a screen make the apparatus much more sensitive to the minute differences in "light-value" of the letters and thus much better adapted for analysing the print than with a plain line of light such as shown in FIG. 2.

It should clearly be understood that the number of possibilities of shapes to be given to the apertures in the screens according to the invention is practically unlimited. It should further be understood that a screen according to the invention may be fitted on any reading device of the kind referred to, although of slightly different construction. So, for instance, the beam of light from the light source need not pass through a bar of quartz-like material, instead of which a system of lenses may be used.

I claim:

1. A reading device comprising a casing, a source of light disposed within said casing and adapted to project a beam of light from one end thereof upon a line of print, means within said casing adapted to receive light reflected from said line of print, and a screen positioned between the light source and said line of print, said screen having at least one opening narrow in width in the direction of extension of the line of print and elongated in length normal to the direction of extension of the line of print, the width of said opening being different at one point than at another point along the length thereof.

2. A reading device as defined in claim 1, wherein said screen is formed with a plurality of different-width openings arranged in a row in the direction normal to the direction of extension of the line of print.

3. A reading device as defined in claim 1, wherein said opening is formed in the shape of a slot elongated in the direction normal to the direction of extension of the line of print and having a plurality of crosswise branches extending in the direction of extension of the line of print.

4. A reading device as defined in claim 1, wherein said opening is in the shape of a plurality of circular holes arranged in a row in the direction normal to the direction of extension of the line of print, said plurality of holes having slot interconnections therebetween.

References Cited by the Examiner
UNITED STATES PATENTS 2,420,716  5/1947  Morton _____ 250—239
2,986,697  5/1961  Luger _____ 250—237

ROBERT C. BAILEY, *Primary Examiner.*

MALCOLM A. MORRISON, *Examiner.*